June 9, 1931.                A. J. GRANBERG                1,809,118
                               FLUID METER
                            Filed July 7, 1930          2 Sheets-Sheet 1

INVENTOR.
Albert J. Granberg.
BY
Townsend, Loftus & Abbett
ATTORNEYS.

June 9, 1931.  A. J. GRANBERG  1,809,118
FLUID METER
Filed July 7, 1930  2 Sheets-Sheet 2

INVENTOR
Albert J. Granberg.
BY Townsend, Loftus & Offett
ATTORNEYS.

Patented June 9, 1931

1,809,118

UNITED STATES PATENT OFFICE

ALBERT J. GRANBERG, OF BERKELEY, CALIFORNIA, ASSIGNOR TO RALPH N. BRODIE COMPANY, OF OAKLAND, CALIFORNIA, A CORPORATION OF CALIFORNIA

FLUID METER

Application filed July 7, 1930. Serial No. 465,956.

This application is a continuation in part of my copending application entitled "Fluid meter", filed December 20, 1927, and bearing Serial Number 241,309.

This invention relates to fluid meters for measuring and indicating the volume of fluids.

In the prior application referred to I have disclosed a meter including a meter casing which is divided into two metering cylinders, each of which is fitted with a reciprocable and rotatable piston. These pistons are formed with ports which cooperate with ports in the cylinders to enable fluid to be admitted to one end of the metering cylinders and to be simultaneously discharged from the opposite end thereof. The pistons are operated by the pressure of the fluid so that a given quantity of fluid will be discharged from each metering cylinder upon each stroke of the piston therein. The pistons act through an intermediate mechanism to operate a counting device to register the total volume of fluid discharged through the meter.

It is the principal object of the present invention to improve this meter to insure against air accumulating in the metering cylinders and rendering the meter inaccurate.

To accomplish this object I provide baffle means in the metering cylinders so that the outward flow of the fluid is so directed that any air accumulated in the metering cylinders will be withdrawn therefrom and discharged with the fluid.

One form which the invention may assume is exemplified in the following description and illustrated by way of example in the accompanying drawings, in which.

Figure 1:
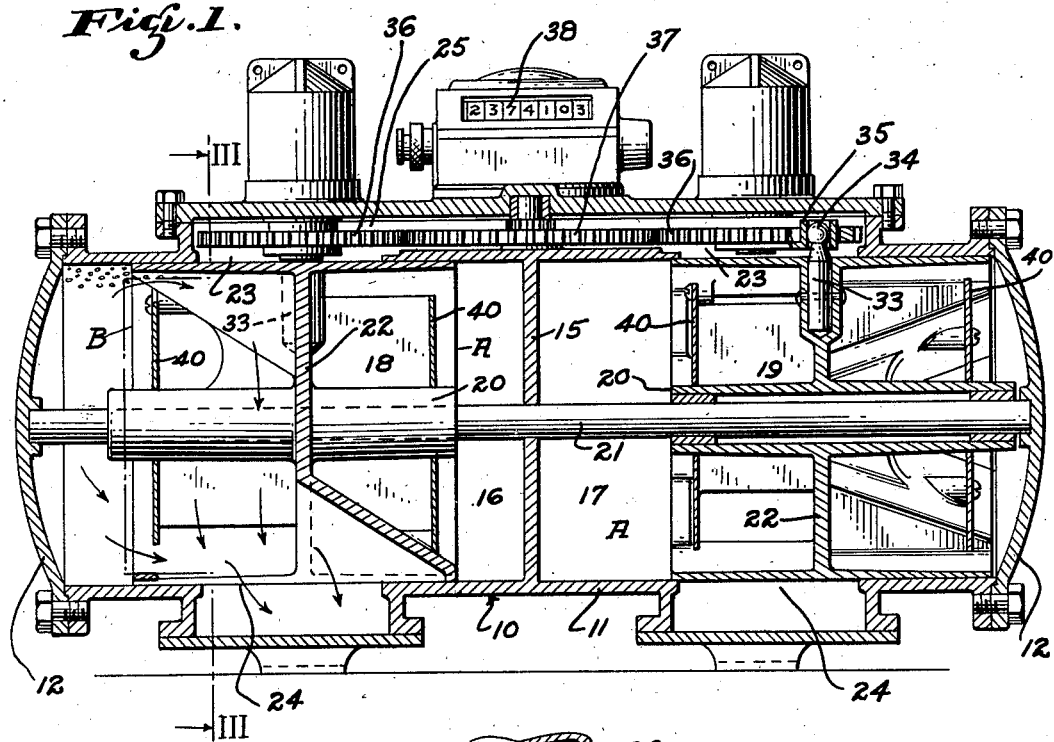
Fig. 1 is a view in central longitudinal section through a meter embodying the preferred form of my invention.

Referring more particularly to the accompanying drawings, 10 indicates a fluid meter capable of measuring and indicating the volume of fluid passed therethrough. This meter comprises a meter casing 11 having its ends enclosed by circular head members 12 which are bolted or otherwise secured to the end of the casing. The casing is provided with a longitudinal bore which is transversely and centrally divided by a partition wall 15 into two metering cylinders 16 and 17.

The cylinders are each fitted with a reciprocable and rotatable piston indicated by the numerals 18 and 19. Each piston is formed with a coaxial guide 20 reciprocably and rotatably mounted on a shaft 21 arranged coaxially of the bore of the casing and supported at its ends in the head members thereof. The pistons 18 and 19 are turned to a diameter so that a running fit will be provided between the peripheral surfaces of the pistons and the bore of the cylinders.

Each piston is hollow with its opposite ends open but provided centrally between its ends with an imperforate partition wall 22. This central partition in the piston of each cylinder effectively divides each cylinder into two metering chambers as will be described.

Reference had to the drawings it will be seen that the cylinders 16 and 17 are each formed with an upper inlet port 23 and a lower discharge port 24 which are in vertical alignment. The upper intake ports 23 communicate with an intake chamber 25 fitted with an intake connection 26. The outlet ports 24 communicate with an outlet chamber 27 which is fitted with an outlet connection 28 preferably in alignment with the intake connection 26 so that the meter may be interposed in a pipe line.

The pistons 18 and 19 are each so constructed and connected that fluid under pressure entering the intake chamber 25 will cause the pistons to reciprocate in synchronism. This is accomplished by first dividing each piston by means of the partition wall 22 and forming the piston with ports so that the fluid may be delivered to opposite ends of the piston at opposite ends of the stroke thereof.

Figure 3:
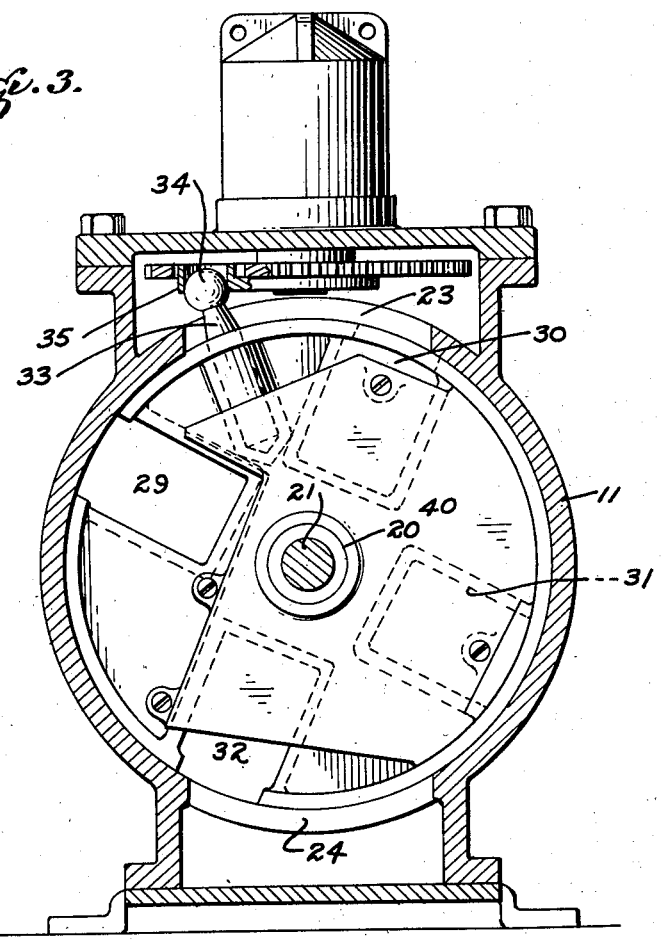
Fig. 3 is a view in transverse section taken on line III—III of Fig. 1.
Figure 4:
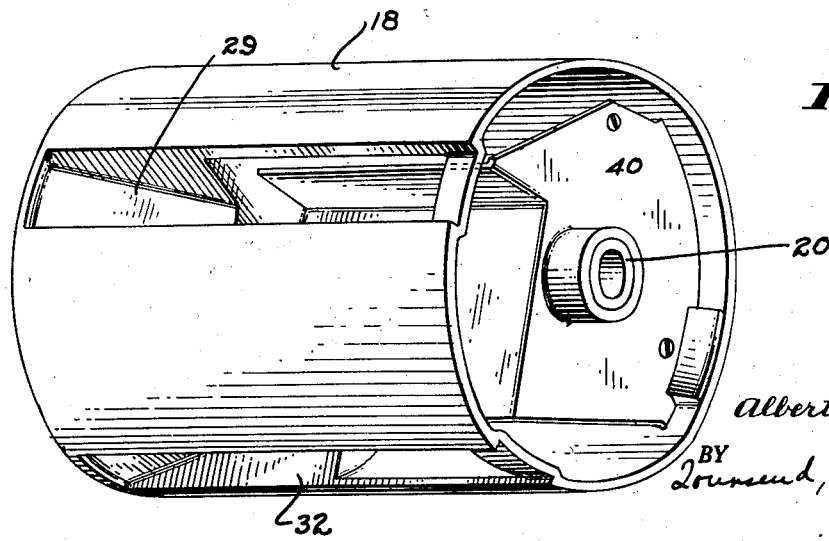
Fig. 4 is a perspective view of one of the pistons employed.

Reference being had to Fig. 3 it will be seen that each piston is formed with four ports 29, 30, 31 and 32. Two of these ports communicate with one end of the piston and the other two communicate with the opposite end of the piston. It will be noticed that diametrically opposed ports communicate with opposite ends of the piston.

Figure 2:
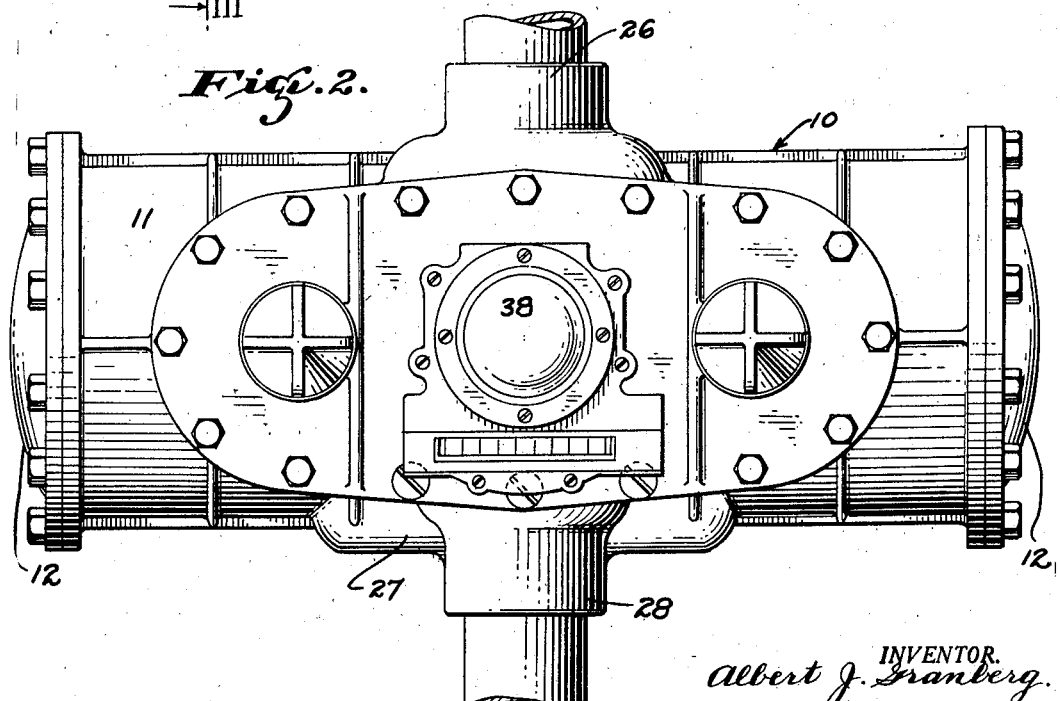
Fig. 2 is a plan view of the same.

Referring to cylinder 16 in Fig. 2 I have indicated the inner end A of the piston 18 and the outer end B of the piston. The ends of the ports which communicate with the outer end B of the piston extend to the inner end A of the piston but at this latter end the wall of the piston is merely recessed on an angle so that the fluid will be directed to the side of the partition wall 22 at the end B of the piston. The ports which communicate with the opposite ends of the piston are similarly formed so as to direct the fluid entering the ports to the end A of the piston.

Assuming that the piston 18 is in the position shown in Fig. 3, the port 30 of the piston will be in communication with the intake port 23 while the port 32 will be in communication with the outlet port 24. Thus, fluid from the intake chamber 25 will discharge through the port 30 into the metering chamber at the end A of the piston while the fluid in the metering chamber at the end B of the piston will discharge through the port 24 into the outlet chamber. I have found in actual practice that but a slight differential in pressure is sufficient to operate the pistons.

In order that the pistons will reciprocate while they are being operated and in order to control the ports in each piston, the pistons are oscillated as they are reciprocated. To accomplish this each piston is fitted with a radial pin 33 which projects radially from the peripheral surface of the piston at a point centrally between its ends. The outer end of this pin 33 is formed with a ball 34 engaging a socket member 35 relatively fixed to a spur gear 36 rotatably mounted in the intake chamber 25. The point of connection between the pin 33 and the gear 36 is at an eccentric point on the latter so that as the piston moves axially it imparts rotation to the gear, which rotation, of course, results in oscillation of the piston. The amount of this oscillation is regulated by the length of the stroke of the outer end of the pin 33. The stroke of the outer end of the pin 33 is substantially equal to the width of the ports in the piston. The spur gears 36 both mesh with a master gear 37 which in turn operates a counting mechanism 38.

In order that one piston may carry the other over dead center the connection between the pin 33 of the piston 19 is disposed relatively ninety degrees from the pin 33, which connects the piston 18 to its gear 36. Therefore, when one piston reaches dead center the other piston has just completed one-half of its stroke and will move the other piston off of dead center and place it in operation.

The points of connection between the pins 33 on the gears 36 are adjustable in order that the meter may be regulated. This adjustment is fully described and claimed in my copending application entitled Fluid meter, filed March 12, 1930 and bearing Serial Number 435,291.

In operation of the meter as just described, assuming that the parts are in the position shown in Figs. 1 and 3, fluid will be delivered through the intake port 23 to the end A of the piston and as the port 32 of the piston will be in communication with the port 24 of the cylinder fluid at the end B of the piston will discharge into the outlet chamber. It will be noticed that the piston 19 is on dead center but as the piston 18 is moved outwardly its movement will be transmitted through the gears 36 and 37 to the piston 19 to move the same off dead center and place its ports into proper register with the ports 23 and 24 so that fluid will be admitted to the outer end of the piston and discharged from the inner end of the piston.

As the piston 18 reaches the outer end of its stroke it will be accurately revolved or oscillated until the ports 30 and 32 are out of register with the ports 23 and 24 in the cylinder and when the piston reaches dead center the ports 23 and 24 will be closed. The piston 19, however, will be midway of its stroke and will move the piston 18 off of dead center and as this movement continues, the piston will be revolved in a direction causing registration of the ports 29 and 31 in the piston with the ports 23 and 24 of the cylinder, thus discharging the fluid from the end A of the piston into the discharge chamber 27 and admitting fluid from the intake chamber 25 into the end of the cylinder at the end B of the piston.

The construction and operation of the meter just described is substantially the same as that in my prior applications referred to and identified herein. However, I have so constructed the pistons that the accumulation of air in the metering chambers is entirely eliminated even though the meter is only provided with a single intake and a single outlet port of each metering cylinder. This is accomplished by fitting the ends of each piston with baffle plates indicated by the numeral 40. These baffle plates enclose substantially the major portion of each end of the pistons and are located closely contiguous to the end thereof. One portion of the baffle plate is inturned so as to engage the center partition 22 so that when the port 29 is in register with the intake port 23, the flow of fluid therethrough into the end of the cylinder will be unobstructed.

The baffle plate at the opposite end of the piston is similarly constructed with the exception that the port 30 is left unobstructed in the same manner that the port 29 is left unobstructed at the end B of the piston.

It will be noticed that at the top and at the bottom, the baffle plate is cut-away so as to form a communication between the extremity of the metering chamber and the space between the baffle and the partition 22. The purpose of this is to restrict the flow at the bottom of the piston through the port 24 so that in order to discharge some of the fluid must discharge over the top of the baffle. This discharge of fluid over the top of the baffle causes the fluid to withdraw any air accumulating in the upper side of the metering chambers and discharge the air into the outlet chamber 24.

It should be obvious that when the piston 18 is moving outwardly, the area of the opening at the bottom of the baffle is insufficient to allow a free flow of the fluid therethrough into the exhaust chamber. Therefore, the fluid must seek additional outlet and will pass over the top of the baffle plate at a considerable velocity withdrawing any air at the top of the metering chamber and discharging the same into the discharge chamber. This is highly desirable because any air accumulating in the meter causes the meter to be inaccurate.

I also desire to point out that the provision of the discharge chamber at the bottom of the cylinder and causing the fluid to flow simultaneously from the top and bottom areas of the metering chambers when discharging has a very advantageous result. The fluid flowing from the top area of the chamber withdraws the air from the chamber while the fluid flowing from the bottom area of the chamber causes the discharge of any heavy foreign matter, which may be present in the fluid, to discharge into the discharge chamber and be eliminated from the meter.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A meter including a horizontally disposed cylinder having an intake port adjacent the top thereof and an outlet port adjacent the bottom thereof, a reciprocable piston mounted in the cylinder and having ports adapted to cooperate with the ports in the cylinder, and means at the ends of the piston causing fluid to discharge simultaneously from the top and bottom of the space intermediate the end of the piston and the end of the cylinder.

2. In a meter having a cylinder, a piston in the cylinder, said piston being centrally divided to form two metering chambers in the cylinder, said cylinder having an intake and a discharge port formed therein, said piston having ports cooperating with said ports in the cylinder whereby fluid will be admitted to one metering chamber and simultaneously discharge from the other and vice versa as the piston reciprocates, and means at each end of the piston causing the fluid to be directed to the discharge port in the cylinder simultaneously from the top and bottom of the metering chamber.

3. In a fluid meter comprising a horizontally disposed cylinder, a piston rotatably and reciprocably mounted in the cylinder, said cylinder having an intake and an exhaust port, said piston being formed with ports cooperating with said exhaust port, said piston being constructed so as to divide said cylinder into two metering chambers and capable of operation to synchronize registration of the ports in the piston with the ports in the cylinder so that fluid will enter one metering chamber and be discharged from the opposite metering chamber simultaneously and vice versa as the piston reciprocates, and baffle means in the metering chambers for causing the fluid being discharged to discharge simultaneously from the top and bottom of the metering chambers.

4. In a meter of the character described, a horizontally disposed cylinder having an intake port at the top thereof and a discharge port at the bottom thereof, a piston reciprocably and rotatably mounted in the cylinder, said piston dividing each cylinder into two metering chambers, said piston having ports formed therein adapted to cooperate with the ports formed in the cylinder whereby fluid will be admitted to one metering chamber and simultaneously discharged from the other and vice versa as the piston reciprocates, and a baffle plate mounted at each end of the piston for causing the fluid being discharged to discharge simultaneously from the upper and bottom areas of the metering chambers.

5. In a meter, a cylindrical member disposed horizontally and divided into two metering cylinders, a piston in each cylinder, said pistons dividing the cylinders into two metering chambers, said cylinders having intake and discharge ports, there being ports formed in each piston for admitting fluid to one metering chamber and simultaneously discharging it from the other metering chamber of each cylinder, a connection between the pistons whereby they will operate synchronously, said connection controlling the rotation of the pistons and the registering of the ports in the pistons with the ports in the cylinders, and baffle means in each metering chamber causing the fluid discharged therefrom to flow simultaneously from the upper and from the lower areas thereof.

ALBERT J. GRANBERG.